United States Patent
Nohara (10) Patent No.: US 11,885,304 B2
(45) Date of Patent: Jan. 30, 2024

(54) WIND TURBINE SYSTEM, WIND TURBINE CONTROL DEVICE, DRIVING METHOD, AND TANGIBLE COMPUTER-READABLE STORAGE MEDIUM STORING PROGRAM

(71) Applicant: Nabtesco Corporation, Tokyo (JP)

(72) Inventor: Osamu Nohara, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/675,695

(22) Filed: Feb. 18, 2022

(65) Prior Publication Data

US 2022/0268257 A1 Aug. 25, 2022

(30) Foreign Application Priority Data

Feb. 25, 2021 (JP) .................... 2021-028675

(51) Int. Cl.
- F03D 7/02 (2006.01)
- F03D 15/00 (2016.01)

(52) U.S. Cl.
CPC ......... *F03D 7/0248* (2013.01); *F03D 7/0204* (2013.01); *F03D 15/00* (2016.05);
(Continued)

(58) Field of Classification Search
CPC .... F03D 7/0204; F03D 7/0244; F03D 7/0248; F03D 80/70; F03D 15/00; F16D 63/006; F16D 67/02; F16D 2121/14; F16D 2129/04; F05B 2250/411; F05B 2260/502; F05B 2260/902; F05B 2260/4031; F05B 2270/32; F05B 2270/321; F05B 2270/331; F05B 2270/335
See application file for complete search history.

(56) References Cited

U.S. PATENT DOCUMENTS

| 10,514,023 B2 * | 12/2019 | Osako ................ F03D 7/0204 |
| 2013/0088009 A1 * | 4/2013 | Cousineau .......... F03D 7/0204 290/44 |

FOREIGN PATENT DOCUMENTS

| CN | 111503068 A | 8/2020 |
| JP | 2012-013085 A | 1/2012 |

(Continued)

OTHER PUBLICATIONS

Extended European Search Report dated Jun. 30, 2022, issued in corresponding European Patent Application No. 22157478.3 (5 pgs.).

*Primary Examiner* — Sabbir Hasan
*Assistant Examiner* — Joshua R Beebe
(74) *Attorney, Agent, or Firm* — Pillsbury Winthrop Shaw Pittman, LLP (57) ABSTRACT

A wind turbine system includes: a ring gear; a yaw drive unit including a pinion gear meshing with the ring gear, the yaw drive unit being configured to rotate the pinion gear; a yaw brake unit configured to generate a braking force for inhibiting rotation of the ring gear; a load information acquiring unit configured to acquire an external load applied to the ring gear; and a control unit configured to release the braking force of the yaw brake unit when a rotational torque generated on the ring gear by the yaw drive unit has been larger than the external load acquired by the load information acquiring unit, in switching the ring gear from a stationary state to a rotating state.

18 Claims, 6 Drawing Sheets

(52) U.S. Cl.
     CPC . *F05B 2260/4031* (2013.01); *F05B 2260/902* (2013.01); *F05B 2270/32* (2013.01); *F05B 2270/321* (2013.01); *F05B 2270/331* (2013.01); *F05B 2270/335* (2013.01)

(56) References Cited

FOREIGN PATENT DOCUMENTS

| WO | WO-2015083633 A1 | * | 6/2015 | ............ | F03D 15/10 |
| WO | WO-2021213602 A1 | * | 10/2021 | ........... | F03D 7/0204 |

\* cited by examiner

WIND TURBINE SYSTEM, WIND TURBINE CONTROL DEVICE, DRIVING METHOD, AND TANGIBLE COMPUTER-READABLE STORAGE MEDIUM STORING PROGRAM

CROSS-REFERENCE TO RELATED APPLICATIONS

This application is based on and claims the benefit of priority from Japanese Patent Application Serial No. 2021-028675 (filed on Feb. 25, 2021), the contents of which are hereby incorporated by reference in their entirety.

TECHNICAL FIELD

The present invention relates to a wind turbine system, a wind turbine control device, a driving method, and a tangible computer-readable storage medium storing a program.

BACKGROUND

One form of wind power generators is a wind turbine system in which a nacelle paced on the top portion of a tower is turned in accordance with the wind direction. The wind turbine system includes a ring gear, which is fixed to the tower, and a yaw drive unit, which is installed in the nacelle, for generating a rotational force on the ring gear. In the wind turbine system, the yaw drive unit generates a rotational force on the ring gear to turn the nacelle.

In the wind turbine system, the nacelle can be stopped at a stop position by applying a braking force to the ring gear to put the ring gear into a stationary state.

In the wind turbine system, the nacelle can be turned by releasing the braking force and rotating the ring gear by the yaw drive unit (see, for example, Japanese Patent Application Publication No. 2012-013085).

However, when the ring gear is rotated by the yaw drive unit, the braking force has been released, and thus the nacelle may be rotated in the direction opposite to the turning direction if the ring gear is under an external load caused by the moment of wind or the like.

SUMMARY

The present invention addresses such a drawback and provides a wind turbine system, a wind turbine control device, a driving method, and a tangible computer-readable storage medium storing a program, each configured to turn the nacelle while preventing the nacelle from rotating in the direction opposite to the turning direction.

(1) One aspect of the present invention is a wind turbine system comprising: a ring gear; a yaw drive unit including a pinion gear meshing with the ring gear, the yaw drive unit being configured to rotate the pinion gear; a yaw brake unit configured to generate a braking force for inhibiting rotation of the ring gear; a load information acquiring unit configured to acquire an external load applied to the ring gear; and a control unit configured to release the braking force of the yaw brake unit when a rotational torque generated on the ring gear by the yaw drive unit has been larger than the external load acquired by the load information acquiring unit, in switching the ring gear from a stationary state to a rotating state.

(2) In the wind turbine system of (1) described above, it is also possible that the yaw brake unit includes a first brake and a second brake, the first brake is configured to generate a braking force on the ring gear, and the second brake is configured to generate a braking force on the yaw drive unit, the braking force generated by the yaw brake unit is a total of a first braking force generated by the first brake and a second braking force generated by the second brake, and the control unit releases the second braking force and then maintains the first braking force until the rotational torque is larger than the external load.

(3) In the wind turbine system of (1) or (2) described above, it is also possible that the load information acquiring unit estimates the external load based on a wind direction and a wind velocity.

(4) In the wind turbine system of any one of (1) to (3) described above, it is also possible that the load information acquiring unit acquires the external load from a sensor provided on the yaw drive unit.

(5) In the wind turbine system of (3) or (4) described above, it is also possible that the control unit causes driving of the yaw drive unit when the external load is equal to or smaller than a predetermined threshold value.

(6) In the wind turbine system of (2) described above, it is also possible that the first brake generates a braking force at a constant level, the wind turbine system includes a rotational torque estimating unit configured to estimate, based on operation information of the yaw drive unit, a maximum rotational torque that can be currently generated by the yaw drive unit, and the control unit causes driving of the yaw drive unit when the maximum rotational torque is larger than a total of the external load and the first braking force.

(7) One aspect of the present invention is a wind turbine control device comprising: a yaw drive unit including a pinion gear meshing with a ring gear provided on a wind turbine, the yaw drive unit being configured to rotate the pinion gear; a load information acquiring unit configured to acquire an external load applied to the ring gear; and a control unit configured to release a braking force of a yaw brake unit when a rotational torque generated on the ring gear by the yaw drive unit has been larger than the external load acquired by the load information acquiring unit, in switching the ring gear from a stationary state to a rotating state.

(8) One aspect of the present invention is a driving method performed by a wind turbine system, the driving method comprising the steps of: generating a braking force for inhibiting rotation of a ring gear meshing with a pinion gear; acquiring an external load applied to the ring gear; and releasing the braking force when a rotational torque generated on the ring gear by a yaw drive unit rotating the pinion gear has been larger than the external load in switching the ring gear from a stationary state to a rotating state.

(9) One aspect of the present invention is a tangible computer-readable storage medium storing a program for causing a computer of a wind turbine system to: generate a braking force for inhibiting rotation of a ring gear meshing with a pinion gear; acquire an external load applied to the ring gear; and release the braking force when a rotational torque generated on the ring gear by a yaw drive unit rotating the pinion gear has been larger than the external load in switching the ring gear from a stationary state to a rotating state.

Advantageous Effects

As described above, according to the one or more aspects of the present invention, it is possible to turn the nacelle while preventing the nacelle from rotating in the direction opposite to the turning direction.

DESCRIPTION OF EXAMPLE EMBODIMENTS

A wind turbine system, a wind turbine control device, a driving method and a program to be executed by a computer of the wind turbine system according to the embodiments will be hereinafter described with reference to the drawings.

First Embodiment

Figure 1:
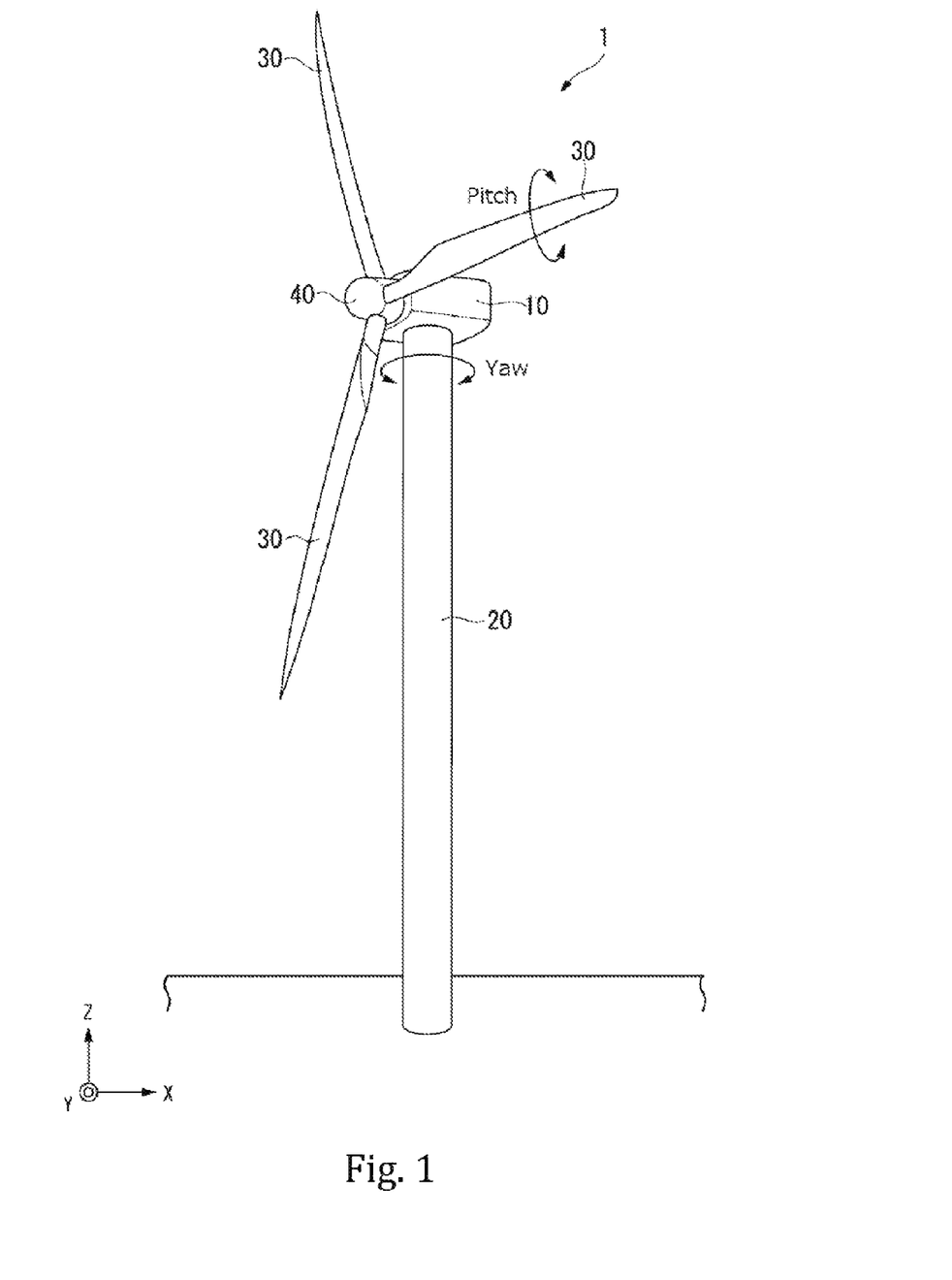
FIG. 1 is a perspective view showing an example configuration of a wind turbine system according to a first embodiment of the invention.

FIG. 1 is a perspective view showing an example configuration of a wind turbine system according to a first embodiment of the invention. As shown in FIG. 1, the wind turbine system 1 includes, for example, a nacelle 10, a tower 20, blades 30, and a hub 40. In the wind turbine system 1, the motive power generated by the rotation of the blades 30 is transmitted from the hub 40 to a power generator (not shown) in the nacelle 10 and converted into an electric power by the power generator. In this way, the wind turbine system 1 performs wind power generation.

The nacelle 10 is situated on a top portion of the tower 20 so as to be rotatable. The blades 30 are mounted to the nacelle 10 via the hub 40. The nacelle 10 turns to adjust the orientation of the blades 30 and the hub 40 in the yaw direction. The wind turbine system 1 includes a driving device unit 100 for rotating the nacelle 10 in the yaw direction. The driving device unit 100 is an example of the wind turbine control device.

The tower 20 is installed on the land or on the sea, for example. The tower 20 extends upward in a vertical direction from the land or the sea, for example.

The blades 30 receive wind force and generate a rotational force. In the example shown in FIG. 1, the wind turbine system 1 includes three blades 30, but this number is not limitative.

The hub 40 is mounted to the nacelle 10, and a plurality of blades 30 are mounted to the hub 40. The hub 40 transmits to a rotating shaft the motive power generated by the wind force received by the blades 30. The hub 40 transmits the motive power based on the wind force to the nacelle 10 via the rotating shaft.

The hub 40 includes pitch drive mechanisms for generating a pitch drive force for rotating the blades 30 in the pitch direction. Each blade 30 is provided with a drive mechanism for generating a pitch drive force. The pitch drive mechanisms rotate the blades 30 in the pitch direction to control the angles of the blades 30 in accordance with the wind velocity.

Figure 2:
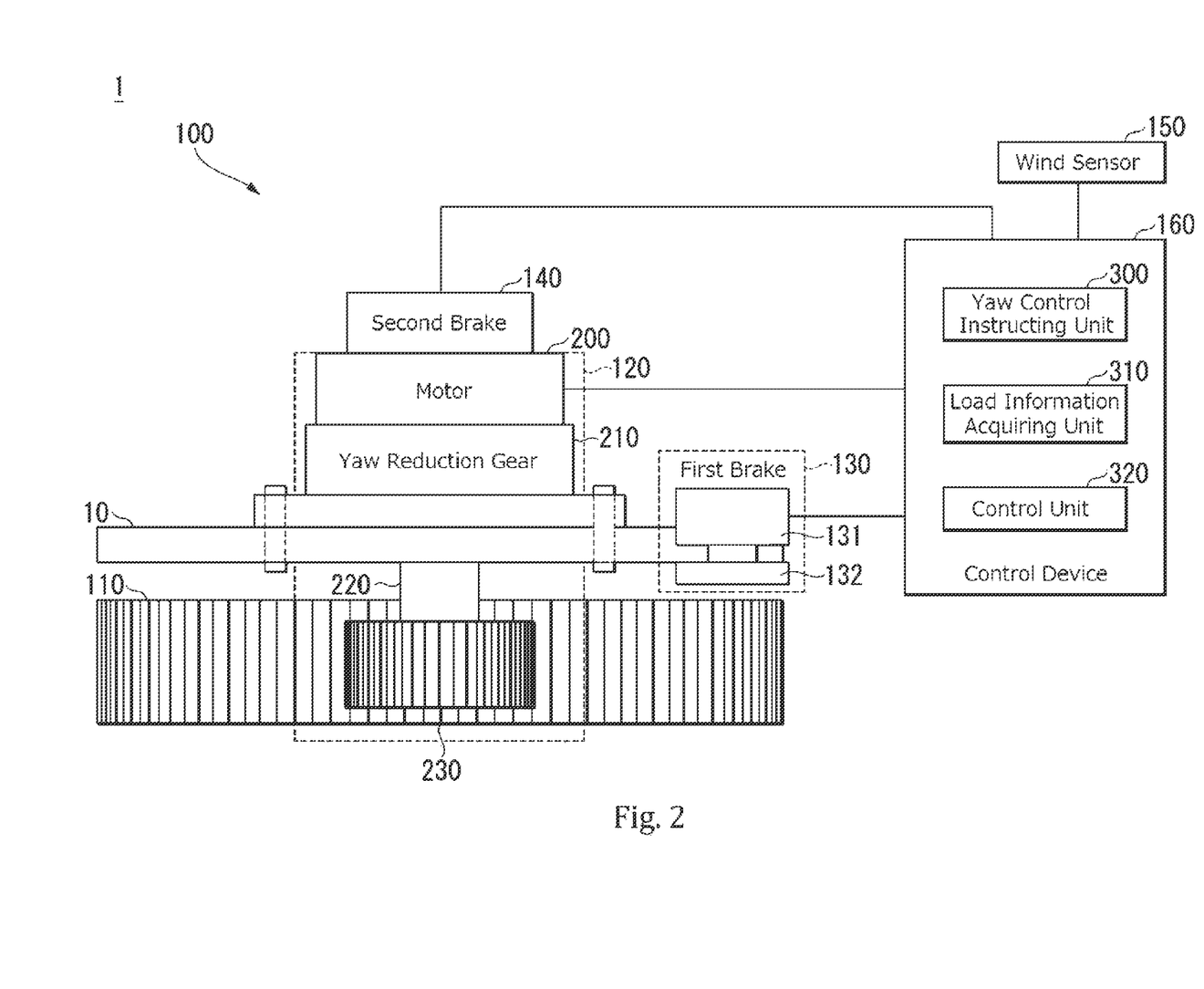
FIG. 2 shows an example configuration of a driving device unit according to the first embodiment.

FIG. 2 shows an example configuration of a driving device unit 100 according to the first embodiment. The driving device unit 100 includes, for example, a ring gear 110, a yaw drive unit 120, a first brake 130, a second brake 140, a wind sensor 150, and a control device 160. Any one or both of the first brake 130 and the second brake 140 are examples of "yaw brake unit."

The ring gear 110 is positioned on the top portion of the tower 20. The ring gear 110 is used to drive the turning of the nacelle 10 in the yaw direction.

The yaw drive unit 120 is installed in the nacelle 10. The yaw drive unit 120 generates a rotational torque on the ring gear 110 to turn the nacelle 10. The driving device unit 100 may include a plurality of yaw drive units 120. The yaw drive unit 120 is fixed, for example, to the nacelle 10 with N bolts.

The yaw drive unit 120 includes, for example, a motor 200, a yaw reduction gear 210, an output shaft 220, and a pinion gear 230.

The motor 200 generates a driving force on the output shaft 220 in accordance with the voltage supplied from the control device 160. The rotational axis of the output shaft 220 extends along the longitudinal direction of the output shaft 220.

The yaw reduction gear 210 uses the gears included in the yaw reduction gear 210 to set the rotational speed of the output shaft 220.

The output shaft 220 is driven by the motor 200 to rotate at a rotational speed reduced by the yaw reduction gear 210. The output shaft 220, which is driven by the motor 200, rotates with a predetermined torque (shaft torque).

The pinion gear 230 is positioned at the end of the output shaft 220 so as to mesh with the ring gear 110. The pinion gear 230 rotates in mesh with the ring gear 110 in accordance with the rotation of the output shaft 220. With this arrangement, the rotational force is applied to the ring gear 110 and, when the rotational force is larger than an external load applied to the ring gear 110, the nacelle 10 rotates in the yaw direction relative to the tower 20. The external load applied to the ring gear mentioned here is a load occurring in the ring gear 110 due to an external factor such as the moment caused by wind.

The first brake 130 generates a braking force (hereinafter referred to as "first braking force") on the ring gear 110. For example, the first brake 130 generates the first braking force on the ring gear 110 at a constant level By way of an example, the first brake 130 shown in FIG. 2 is a hydraulic brake, but it may also be a mechanical brake or any other type of brake. The first brake 130 generates the first braking force in accordance with a control signal from the control device 160. For example, the first brake 130 includes a hydraulic brake driving unit 131 and a friction member 132. The hydraulic brake driving unit 131 moves the friction member 132 in the Z direction shown in FIG. 1 in accordance with the control signal provided from the control device 160. The hydraulic brake driving unit 131 generates the first braking force on the ring gear 110 by urging the friction member 132 against the ring gear 110.

The second brake 140 is installed in the nacelle 10, for example. The second brake 140 generates a braking force (hereinafter referred to as "second braking force") on the yaw drive unit 120. The second brake 140, which is an electromagnetic brake for example, generates the second braking force on the output shaft 220. The second brake 140 generates the second braking force in accordance with a control signal from the control device 160.

The wind sensor 150 is disposed for example, on the top surface of the nacelle 10. The wind sensor 150 senses the wind velocity and the wind direction and outputs the sensing results to the control device 160. The wind sensor 150 may be constituted by a wind velocity sensor and a wind direction sensor.

The control device 160 is installed in the nacelle 10, for example. The control device 160 includes, for example, a yaw control instructing unit 300, a load information acquiring unit 310, and a control unit 320. These components are formed by, for example, a hardware processor such as a CPU (central processing unit) executing programs (software). A part or all of these components may be formed by hardware (including circuitry) such as an LSI (large scale integrated circuit), an ASIC (application specific integrated circuit), an FPGA (field-programmable gate array), and a GPU (graphics processing unit) or may be formed by cooperation between software and hardware. The programs may be previously stored on a storage device (a storage device including a non-transitory storage medium) such as a HDD (hard disk drive) or a flash memory, or the programs may be stored on a removable storage medium (a non-transitory storage medium) such as a DVD or a CD-ROM and installed on the storage device when the storage medium is mounted to a drive device. The storage device is constituted by, for example, a HDD, a flash memory, an EEPROM (electrically erasable programmable read only memory), a ROM (read only memory), or a RAM (random access memory).

The yaw control instructing unit 300 determines a wind direction deflection based on the wind direction sensed by the wind sensor 150. Based on the determined wind direction deflection, the yaw control instructing unit 300 outputs a turn instruction for causing the nacelle 10 to turn. The wind direction deflection refers to the angular difference between the wind direction sensed by the wind sensor 150 and the surfaces of the blades 30.

The load information acquiring unit 310 acquires an external load applied to the ring gear 110. The acquisition of an external load applied to the ring gear 110 includes estimation of the external load. For example, the load information acquiring unit 310 estimates an external load based on the wind direction and the wind velocity sensed by the wind sensor 150. Alternatively, the load information acquiring unit 310 may acquire an external load from a sensor provided on the yaw drive unit 120 (hereinafter referred to as "load sensor"). The load sensor is, for example, a strain sensor configured to output a signal in accordance with a strain occurring in a fastening bolt. Alternatively, the load sensor may be any type of sensor that can detect the external load either directly or indirectly.

When receiving the turn instruction from the yaw control instructing unit 300, the control unit 320 switches the ring gear 110 from a stationary state to a rotating state. In switching the ring gear 110 from the stationary state to the rotating state, the control unit 320 releases the braking force of the yaw brake unit when the rotational torque generated on the ring gear 110 by the yaw drive unit 120 has been larger than the external load acquired by the load information acquiring unit 310. The braking force of the yaw brake unit mentioned here refers to any of the first braking force, the second braking force, and the total of the first braking force and the second braking force. In the following description of the embodiment, the braking force of the yaw brake unit is supposed to be the total of the first braking force and the second braking force. Releasing the braking force of the yaw brake unit is releasing both or any one of the first braking force and the second braking force. When both the first braking force and the second braking force are released, the timing of releasing the first braking force and the timing of releasing the second braking force are either the same or different. For example, in switching the ring gear 110 from the stationary state to the rotating state, the control unit 320 may first release the second braking force, and it may then release the first braking force when the rotational torque has been larger than the external load acquired by the load information acquiring unit 310. In other words, the control unit 320, which has released the second braking force, may maintain the first braking force until the rotational torque is larger than the external load.

Figure 3:
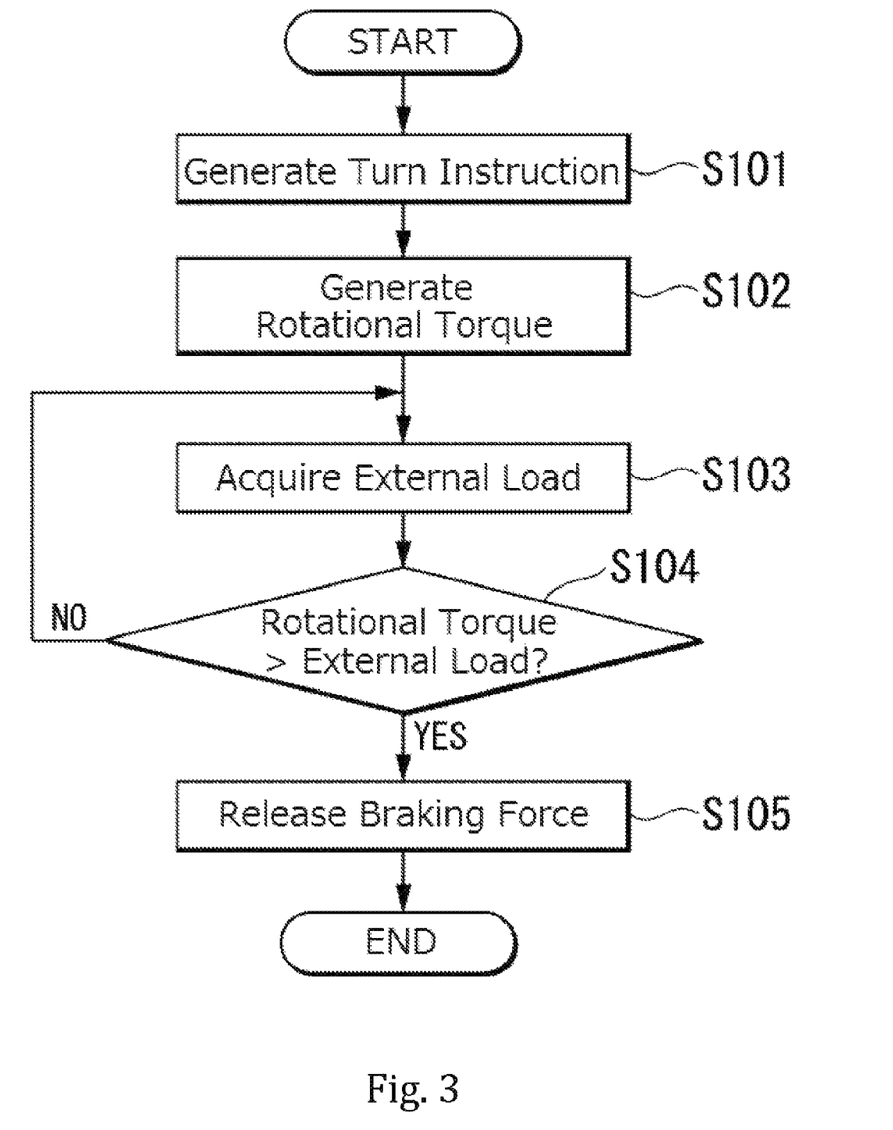
FIG. 3 is a flowchart of the operation of the wind turbine system for starting turning of a nacelle in the first embodiment.

With reference to FIG. 3, the following describes a flow of the operation of the wind turbine system 1 for starting the turning of the nacelle 10 in the state in which the turning of the nacelle 10 is stopped. FIG. 3 is a flowchart of the operation of the wind turbine system 1 for starting turning of the nacelle 10 in the first embodiment.

The state in which the turning of the nacelle 10 is stopped refers to the state in which the ring gear 110 is stationary by the braking force of the yaw brake unit (hereinafter referred to as "stationary state"). In this state, the yaw control instructing unit 300 generates a turn instruction (step S101), and then the control device 160 performs a process of switching the ring gear 110 from the stationary state to the rotating state. For example, when the turn instruction is generated, the control unit 320 applies a voltage to the motor 200 of the yaw drive unit 120 for generation of a rotational torque on the ring gear 110 (step S102). When the rotational torque is generated, the external load occurring due to an external factor such as the moment caused by wind may be larger than the rotational torque. Even in such cases, the braking force generated by the yaw brake unit is maintained on the ring gear 110, and therefore, the nacelle 10 can be inhibited from rotating in the direction opposite to the turning direction.

The load information acquiring unit 310 acquires an external load applied to the ring gear 110 at regular interval (step S103). In the example shown in FIG. 3, the timing at which the load information acquiring unit 310 starts acquiring the external load is after step S102, but this may be before step S102.

The control unit 320 gradually raises the voltage applied to the motor 200 to increase the rotational torque. The control unit 320 determines whether or not the rotational torque generated on the ring gear 110 by the yaw drive unit 120 is larger than the external load acquired by the load information acquiring unit 310 (step S104). When determining that the rotational torque is equal to or smaller than the external load, the control unit 320 proceeds to step S103, for example. On the other hand, when determining that the rotational torque is larger than the external load, the control unit 320 releases the braking force of the yaw brake unit (step S105). Thus, when the braking force of the yaw brake unit is released, the rotational torque is larger than the external load, making it possible to prevent the nacelle 10 from rotating in the direction opposite to the turning direction. In this way, the wind turbine system 1 is configured such that it is possible to start the turning of the nacelle 10 while preventing the nacelle 10 from rotating in the direction opposite to the turning direction.

Figure 4:
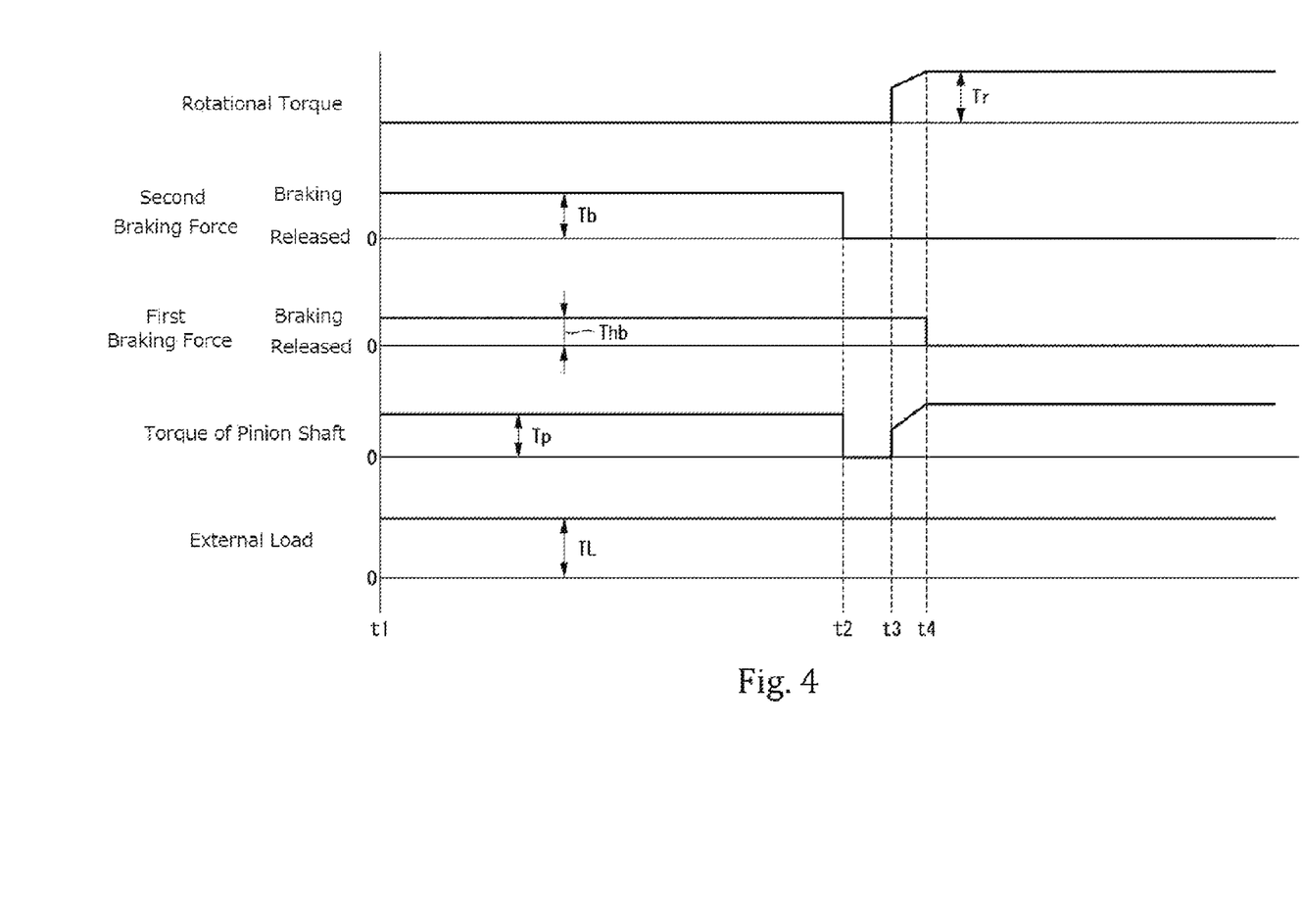
FIG. 4 is a timing chart of the operation of the wind turbine system for starting turning of the nacelle in the first embodiment.

FIG. 4 is a timing chart of the operation of the wind turbine system 1 for starting the turning of the nacelle in the first embodiment. FIG. 4 shows an example in which the timing of releasing the first braking force and the timing of releasing the second braking force are different.

At time t1, in the wind turbine system 1, the turning of the nacelle 10 is stopped by generating a braking force on the ring gear 110, and the braking force is a total of the first braking force Thb of the first brake and the second braking force Tb of the second brake. In the example shown in FIG. 4, the moment caused by wind in the direction opposite to the turning direction is generated, and the first braking force Thb is smaller than the external load TL Therefore, a torque Tp is applied to the output shaft 220.

In switching the ring gear 110 from the stationary state to the rotating state after time t1, the control unit 320 first control the second brake 140 to release the second braking force at time t2. When the second braking force is released, the torsion in the output shaft 220 is released, and the torque Tp of the output shaft 220 becomes zero or a value close to zero. At time t3, after the second braking force is released the control unit 320 causes a voltage to be applied to the motor 200 for generation of the rotational torque. The control unit 320 gradually increases the rotational torque, while maintaining the first braking force until the rotational torque is larger than the external load acquired by the load information acquiring unit 310. The control unit 320 releases the first braking force at time t4, when the rotational torque has been larger than the external load acquired by the load information acquiring unit 310.

In the period between time t3 and time t4, if the relationship of the rotational torque≥the external load—the first braking force is maintained, the nacelle does not rotate in the direction opposite to the turning direction. When the first braking force is released, the relationship of the rotational torque (Tr)>the external load (TL) is satisfied, and therefore, the nacelle 10 also does not rotate in the direction opposite to the turning direction at and after time t4. In the example shown in FIG. 4, before the rotational torque is generated the second braking force is released, while the first braking force is maintained. This operation inhibits sudden rotation of the ring gear 110 in the direction opposite to the turning direction caused by the torsional torque of the output shaft 220, which may occur when the second braking force is released after the rotational force is generated while the first braking force is released.

As described above, the wind turbine system 1 according to the first embodiment includes the ring gear 110, the yaw drive unit 120, the yaw brake unit (for example, the first brake 130 and the second brake 140), the load information acquiring unit 310, and the control unit 320. The ring gear 110 is fixed to the tower 20 of the wind turbine system 1. The yaw drive unit 120 includes the pinion gear meshing with the ring gear 110. The yaw drive unit 120 causes the pinion gear 230 to rotate. The yaw brake unit generates a braking force for inhibiting rotation of the ring gear 110. The load information acquiring unit 310 acquires an external load applied to the ring gear 110. In switching the ring gear 110 from the stationary state to the rotating state, the control unit 320 releases the braking force of the yaw brake unit when the rotational torque generated on the ring gear 110 by the yaw drive unit 120 has been larger than the external load acquired by the load information acquiring unit 310.

With this arrangement, it is possible to turn the nacelle 10 while preventing the nacelle 10 from rotating in the direction opposite to the turning direction.

In the first embodiment, the yaw brake unit may include the first brake 130 and the second brake 140. The first brake 130 generates a braking force on the ring gear 110, and the second brake 140 generates a braking force on the yaw drive unit 120. The braking force of the yaw brake unit may be the total of the first braking force of the first brake 130 and the second braking force of the second brake 140. In this case, the control unit 320 may release the second braking force and then maintain the first braking force until the estimated rotational torque is larger than the external load. This operation makes it possible to release the torsion in the output shaft 220 before rotation of the motor 200 and thus to prevent the nacelle 10 from rotating in the direction opposite to the turning direction more securely.

In the first embodiment, the load information acquiring unit 310 may estimate the external load applied to the ring gear 110 based on the wind direction and the wind velocity. Thus, the wind turbine system 1 can acquire the external load without use of a dedicated sensor for estimating the external load.

In the first embodiment, the load information acquiring unit 310 may acquire the external load applied to the ring gear 110 from a sensor provided on the yaw drive unit 120. Thus, the wind turbine system 1 can acquire the external load accurately.

In the first embodiment, it is also possible that the control unit 320 causes driving of the yaw drive unit 120 when the external load acquired by the load information acquiring unit 310 is equal to or smaller than a predetermined threshold value. The predetermined threshold value indicates that substantially no external load is applied Thus, the wind turbine system 1 can drive the yaw drive unit 120 after it is confirmed that no external load is applied.

Second Embodiment

The following describes a wind turbine system 1A according to the second embodiment. In the following description, parts having the same functions as those of the first embodiment will have the same names and reference numerals, and their functions will not be described.

Figure 5:
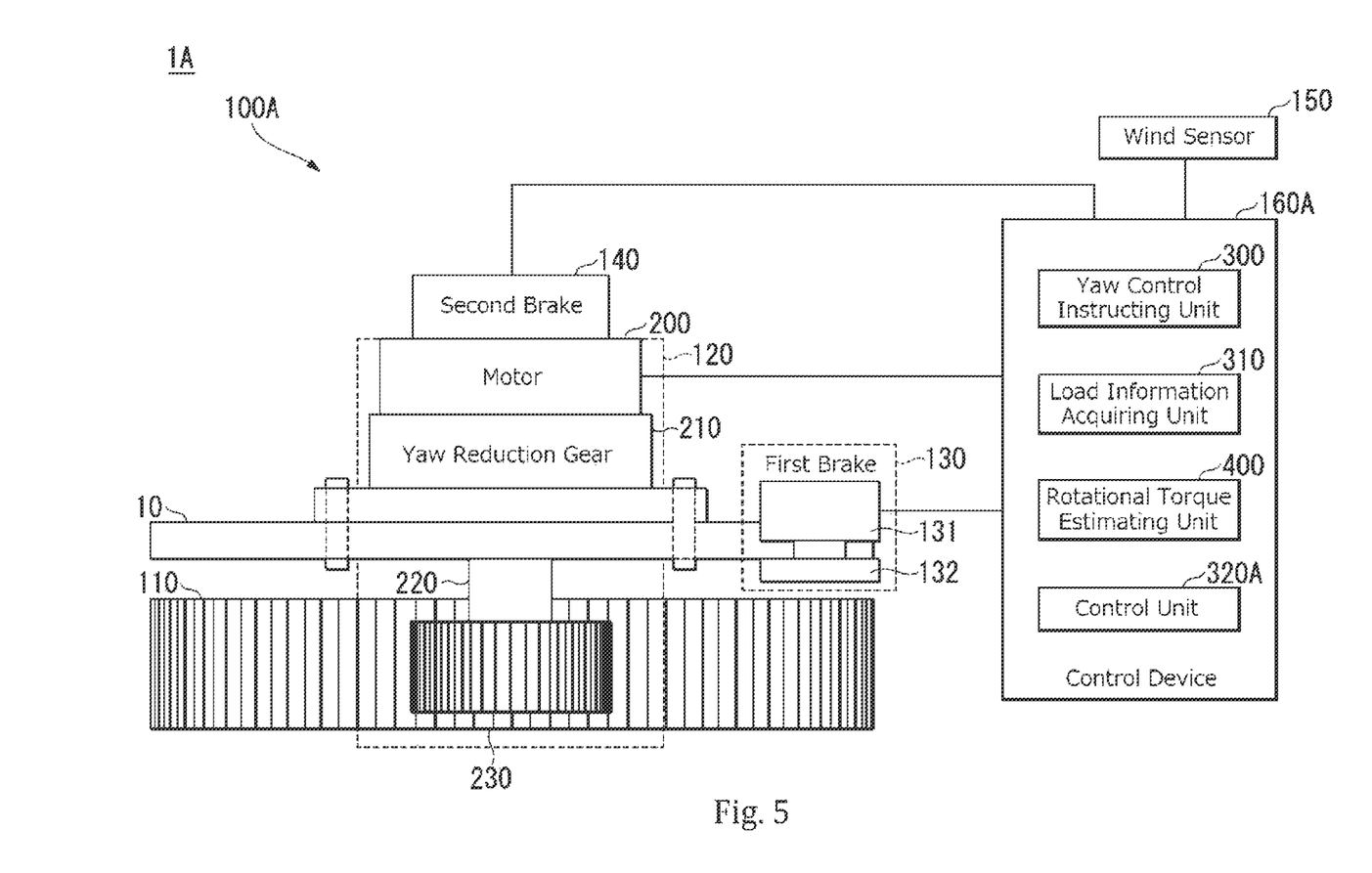
FIG. 5 shows an example configuration of a driving device unit included in a wind turbine system according to a second embodiment.

FIG. 5 shows an example configuration of a driving device unit 100A included in the wind turbine system 1A according to the second embodiment. The difference from the first embodiment shown in FIG. 1 is that the wind turbine system 1A according to the second embodiment includes a rotational torque estimating unit 400. The following description will be focused on this difference.

FIG. 5 shows an example configuration of the driving device unit 100A according to the second embodiment. The driving device unit 100A includes, for example, a ring gear 110, a yaw drive unit 120, a first brake 130, a second brake 140, a wind sensor 150, and a control device 160A.

The control device 160A is installed in the nacelle 10, for example. The control device 160A includes, for example, a yaw control instructing unit 300, a load information acquiring unit 310, a rotational torque estimating unit 400, and a control unit 320A. These components are formed by, for example, a hardware processor such as a CPU executing programs (software). A part or all of these components may be formed by hardware (including circuitry) such as an LSI, an ASIC, an FPGA, and a GPU or may be formed by cooperation between software and hardware. The programs may be previously stored on a storage device (a storage device including a non-transitory storage medium) such as a HDD or a flash memory, or the programs may be stored on a removable storage medium (a non-transitory storage medium) such as a DVD or a CD-ROM and installed on the storage device when the storage medium is mounted to a drive device. The storage device is constituted by, for example, a HDD, a flash memory, an EEPROM, a ROM, or a RAM.

The rotational torque estimating unit 400 estimates, based on the operation information of the yaw drive unit 120, a maximum rotational torque that can be currently generated by the yaw drive unit 120 (hereinafter referred to as "maximum rotational torque").

When the maximum rotational torque estimated by the rotational torque estimating unit 400 is larger than the total of the external load acquired by the load information acquiring unit 310 and the first braking force generated by the first brake 130 at a constant level, the control unit 320A causes driving of the yaw drive unit 120. For example, when the second brake has been released and the estimated maximum rotational torque is larger than the total of the external load acquired by the load information acquiring unit 310 and the first braking force generated by the first brake 130, the control unit 320A drives the motor 200 to generate the maximum rotational torque. This operation makes it possible to switch the ring gear 110 to the rotating state while maintaining the first braking force. Thus, the wind turbine system 1A is configured such that it is possible to turn the nacelle 10 while preventing the nacelle 10 from rotating in the direction opposite to the turning direction.

Figure 6:
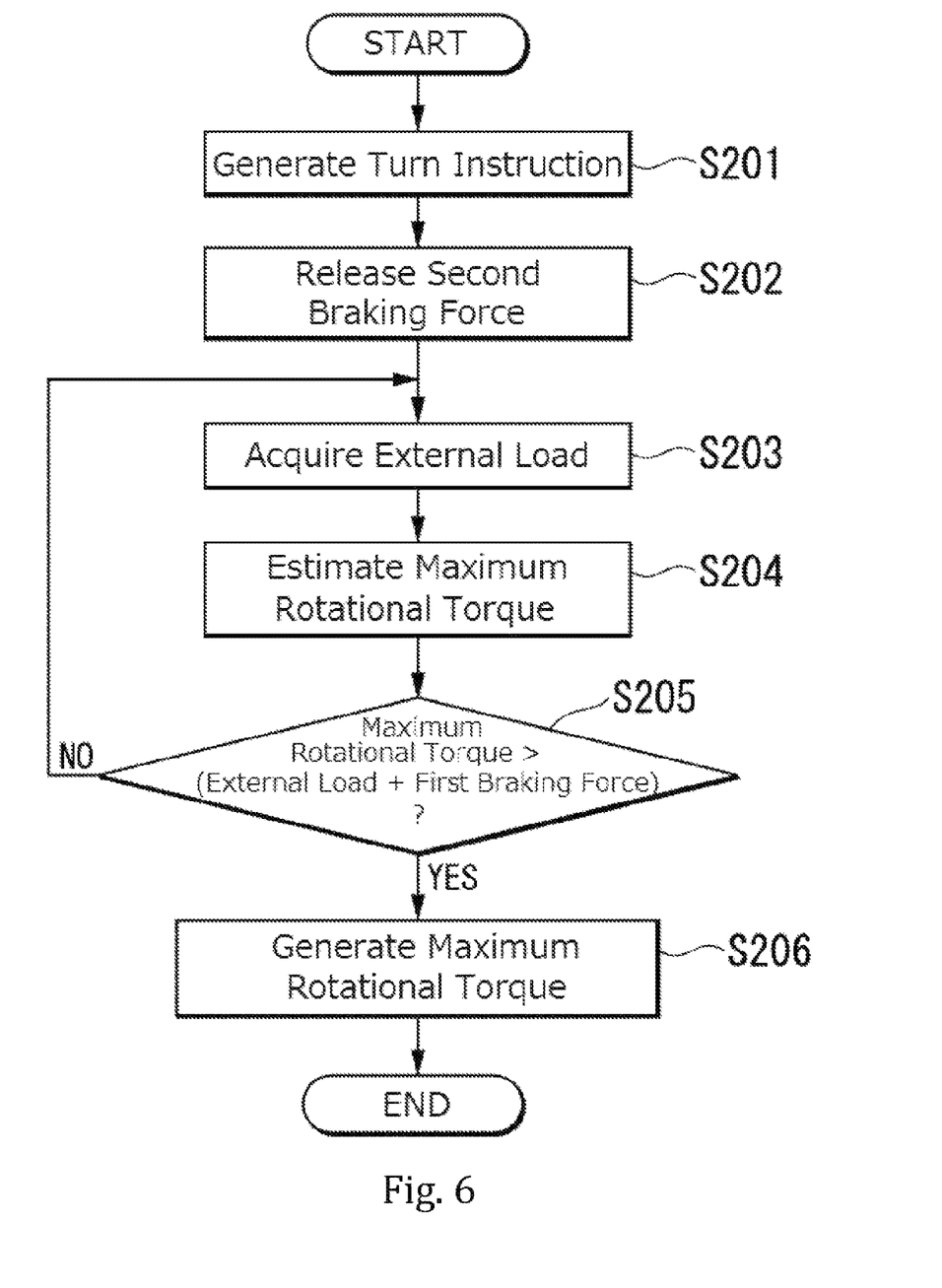
FIG. 6 is a flowchart of the operation of the wind turbine system for starting turning of a nacelle in the second embodiment.

With reference to FIG. 6, the following describes a flow of the operation of the wind turbine system 1A according to the second embodiment for starting the turning of the nacelle 10 in the state in which the turning of the nacelle 10 is stopped FIG. 6 is a flowchart of the operation of the wind turbine system 1A for starting turning of the nacelle 10 in the second embodiment.

In the state in which the turning of the nacelle 10 is stopped the yaw control instructing unit 300 generates a turn instruction (step S201), and then the control device 160A performs a process of switching the ring gear 110 from the stationary state to the rotating state. For example, when the turning instruction is generated, the control unit 320A controls the second brake 140 to release the second braking force (step S202). After the second braking force is released by the control unit 320A, the load information acquiring unit 310 acquires an external load applied to the ring gear 110 at regular intervals (step S203). In the example shown in FIG. 6, the timing at which the load information acquiring unit 310 starts acquiring the external load is after step S202, but this may be before step S202.

The rotational torque estimating unit 400 estimates, based on the operation information of the yaw drive unit 120, a maximum rotational torque that can be currently generated by the yaw drive unit 120 (step S204). In the example shown in FIG. 6, the timing at which the rotational torque estimating unit 400 estimates the maximum rotational torque is after step S203, but this may be simultaneous with step S203, or it may be before step S203.

After releasing the second braking force, the control unit 320A determines whether or not the maximum rotational torque estimated by the rotational torque estimating unit 400 is larger than the total of the external load acquired by the load information acquiring unit 310 and the first braking force generated at a constant level (step S205). When determining that the estimated maximum rotational torque is larger than the above total, the control unit 320A drives the motor 200 to generate the maximum rotational torque (step S206). On the other hand when the estimated maximum rotational torque is equal to or smaller than the above total the control unit 320A proceeds to step S203. The control unit 320A may release the first braking force after step S206, if the maximum rotational torque is larger than the external load acquired by the load information acquiring unit 310.

As described above, the wind turbine system 1A according to the second embodiment additionally includes the rotational torque estimating unit 400, as compared to the first embodiment. The first brake 130 in the wind turbine system 1A generates a braking force at a constant level. The rotational torque estimating unit 400 estimates, based on the operation information of the yaw drive unit 120, a maximum rotational torque that can be currently generated by the yaw drive unit 120. The control unit 320A causes driving of the yaw drive unit 120 when the maximum rotational torque estimated is larger than the total of the external load and the first braking force.

This configuration makes it possible to switch the ring gear 110 to the rotating state while maintaining the first braking force. Thus, it is possible to turn the nacelle 10 while preventing the nacelle 10 from rotating in the direction opposite to the turning direction. Since the driving of the yaw drive unit 120 is started when it is determined that the maximum rotational torque is larger than the total of the external load and the first braking force, it is possible to inhibit generation of a useless amount of first braking force or rotational force and thus relieve the deterioration of the first brake 130 and the motor 200.

According to at least one of the embodiments described above, in switching the ring gear 110 from the stationary state to the rotating state, the braking force of the yaw brake unit is released when the rotational torque generated on the ring gear 110 by the yaw drive unit 120 has been larger than the external load acquired by the load information acquiring unit 310. This configuration makes it possible to turn the nacelle 10 while preventing the nacelle 10 from rotating in the direction opposite to the turning direction.

The functions of the control devices 160, 160A according to the embodiments described above may be implemented in a program stored on a tangible computer-readable storage medium, and the program stored on the storage medium may be loaded onto a computer system and executed for processing. The "computer system" mentioned here may include an operating system (OS) or hardware such as peripheral devices.

The "computer-readable storage medium" mentioned above refers to a storage device such as a flexible disc, a magneto-optical disc, a ROM (Read Only Memory), a flash memory or any other writable non-volatile memory, a DVD (Digital Versatile Disc) or any other portable medium, and a hard disk built-in to the computer system.

Further, the "computer-readable storage medium" includes storage media that retain the program for some period of time, like a volatile memory (for example, DRAM (Dynamic Random Access Memory)) in an information processing device or a computer system that operates as a client receiving the program through a network such as the Internet or a communication line such as a telephone line.

The computer program mentioned above may be transmitted from a computer system that includes a storage device or the like storing the program to another computer system through a transmission medium or by a transmission wave in a transmission medium. The "transmission medium" for transmitting the program refers to a medium that operates to transmit information, like a network (communication network) such as the Internet or a communication line (communication wire) such as the telephone line.

Only a part of the functions described above may be implemented in the above program. Further, the functions described above may be implemented by a combination of the above program and other programs previously stored on the computer system. That is, the above program may be what is called a difference file (a difference program).

The foregoing is the description of the embodiments of the present invention with reference to the drawings. Specific configurations of the present invention are not limited to the above embodiments but include design modifications within the purport of the present invention.

LIST OF REFERENCE NUMBERS 1, 1A wind turbine system
10 nacelle
20 tower
30 blade
40 hub
100, 100A driving device unit
110 ring gear
120 yaw drive unit
130 first brake
140 second brake
150 wind sensor
160, 160A control device
300 yaw control instructing unit
310 load information acquiring unit
320, 320A control unit
400 rotational torque estimating unit

What is claimed is:

1. A wind turbine system comprising:
a ring gear;
a yaw drive unit including a pinion gear meshing with the ring gear, the yaw drive unit being configured to rotate the pinion gear;
a yaw brake unit configured to generate a braking force for inhibiting rotation of the ring gear;
a load information acquiring unit configured to acquire an external load applied to the ring gear;
a yaw control instructing unit configured to determine a wind direction deflection based on a wind direction sensed by a wind sensor, and to output a turn instruction to rotate the ring gear based on the determined wind direction deflection, and
a control unit configured to switch the ring gear from a stationary state to a rotating state based on the turn instruction,
wherein the control unit, in switching the ring gear from the stationary state to the rotating state, is configured to release the braking force of the yaw brake unit when a rotational torque generated on the ring gear by the yaw drive unit has been larger than the external load acquired by the load information acquiring unit, and to switch the ring gear to a rotating state with the rotational torque by the yaw drive unit larger than the external load.

2. The wind turbine system of claim 1, wherein the yaw brake unit includes a first brake and a second brake, the first brake is configured to generate a braking force on the ring gear, and the second brake is configured to generate a braking force on the yaw drive unit,
wherein the braking force generated by the yaw brake unit is a total of a first braking force generated by the first brake and a second braking force generated by the second brake, and
wherein the control unit releases the second braking force and then maintains the first braking force until the rotational torque is larger than the external load.

3. The wind turbine system of claim 2, wherein the load information acquiring unit estimates the external load based on a wind direction and a wind velocity.

4. The wind turbine system of claim 3, wherein the load information acquiring unit acquires the external load from a sensor provided on the yaw drive unit.

5. The wind turbine system of claim 4, wherein the control unit causes driving of the yaw drive unit when the external load is equal to or smaller than a predetermined threshold value.

6. The wind turbine system of claim 3, wherein the control unit causes driving of the yaw drive unit when the external load is equal to or smaller than a predetermined threshold value.

7. The wind turbine system of claim 2, wherein the load information acquiring unit acquires the external load from a sensor provided on the yaw drive unit.

8. The wind turbine system of claim 7, wherein the control unit causes driving of the yaw drive unit when the external load is equal to or smaller than a predetermined threshold value.

9. The wind turbine system of claim 2, wherein the first brake generates a braking force at a constant level,
wherein the wind turbine system includes a rotational torque estimating unit configured to estimate, based on operation information of the yaw drive unit, a maximum rotational torque that can be currently generated by the yaw drive unit, and
wherein the control unit causes driving of the yaw drive unit when the maximum rotational torque is larger than a total of the external load and the first braking force.

10. The wind turbine system of claim 1, wherein the load information acquiring unit estimates the external load based on a wind direction and a wind velocity.

11. The wind turbine system of claim 10, wherein the load information acquiring unit acquires the external load from a sensor provided on the yaw drive unit.

12. The wind turbine system of claim 11, wherein the control unit causes driving of the yaw drive unit when the external load is equal to or smaller than a predetermined threshold value.

13. The wind turbine system of claim 10, wherein the control unit causes driving of the yaw drive unit when the external load is equal to or smaller than a predetermined threshold value.

14. The wind turbine system of claim 1, wherein the load information acquiring unit acquires the external load from a sensor provided on the yaw drive unit.

15. The wind turbine system of claim 14, wherein the control unit causes driving of the yaw drive unit when the external load is equal to or smaller than a predetermined threshold value.

16. A wind turbine control device comprising:
a yaw drive unit including a pinion gear meshing with a ring gear provided on a wind turbine, the yaw drive unit being configured to rotate the pinion gear;
a load information acquiring unit configured to acquire an external load applied to the ring gear;
a yaw control instructing unit configured to determine a wind direction deflection based on a wind direction sensed by a wind sensor, and to output a turn instruction to rotate the ring gear based on the determined wind direction deflection, and
a control unit configured to switch the ring gear from a stationary state to a rotating state based on the turn instruction, wherein the control unit, in switching the ring gear from the stationary state to the rotating state, is configured to release a braking force of a yaw brake unit when a rotational torque generated on the ring gear by the yaw drive unit has been larger than the external load acquired by the load information acquiring unit, and to switch the ring gear to a rotating state with the rotational torque by the yaw drive unit larger than the external load.

17. A driving method performed by a wind turbine system, the driving method comprising the steps of:
generating a braking force for inhibiting rotation of a ring gear meshing with a pinion gear;
acquiring an external load applied to the ring gear;
determining a wind direction deflection based on a wind direction sensed by a wind sensor, and outputting a turn instruction to rotate the ring gear based on the determined wind direction deflection, and
switching the ring gear from a stationary state to a rotating state based on the turn instruction,
in switching the ring gear from the stationary state to the rotating state, releasing the braking force when a rotational torque generated on the ring gear by a yaw drive unit rotating the pinion gear has been larger than the external load, and switching the ring gear to a rotating state with the rotational torque by the yaw drive unit larger than the external load.

18. A tangible computer-readable storage medium storing a program for causing a computer of a wind turbine system to:
generate a braking force for inhibiting rotation of a ring gear meshing with a pinion gear;
acquire an external load applied to the ring gear;
determining a wind direction deflection based on a wind direction sensed by a wind sensor, and outputting a turn instruction to rotate the ring gear based on the determined wind direction deflection, and
switching the ring gear from a stationary state to a rotating state based on the turn instruction,
in switching the ring gear from the stationary state to the rotating state, release the braking force when a rotational torque generated on the ring gear by a yaw drive unit rotating the pinion gear has been larger than the external load, and switch the ring gear to a rotating state with the rotational torque by the yaw drive unit larger than the external load.

* * * * *